United States Patent
Dai et al.

(10) Patent No.: US 9,678,645 B2
(45) Date of Patent: Jun. 13, 2017

(54) INTERACTIVE MAP MARKERS

(71) Applicant: ORACLE INTERNATIONAL CORPORATION, Redwood Shores, CA (US)

(72) Inventors: Yi Dai, Winchester, MA (US); Hugh Zhang, Winchester, MA (US); Jairam Ramanathan, Waltham, MA (US); Prashant Singh, Lexington, MA (US)

(73) Assignee: Oracle International Corporation, Redwood Shores, CA (US)

( * ) Notice: Subject to any disclaimer, the term of this patent is extended or adjusted under 35 U.S.C. 154(b) by 217 days.

(21) Appl. No.: 14/302,887

(22) Filed: Jun. 12, 2014

(65) Prior Publication Data
US 2015/0363081 A1 Dec. 17, 2015

(51) Int. Cl.
*G06F 3/048* (2013.01)
*G06F 3/0484* (2013.01)

(52) U.S. Cl.
CPC ...... *G06F 3/04845* (2013.01); *G06F 3/04842* (2013.01); *G06F 3/04847* (2013.01)

(58) Field of Classification Search
None
See application file for complete search history.

(56) References Cited

U.S. PATENT DOCUMENTS

| | | | |
|---|---|---|---|
| 7,925,611 B1* | 4/2011 | Bromley | G05B 19/409 706/11 |
| 2009/0100018 A1* | 4/2009 | Roberts | G06Q 30/0603 |
| 2010/0058250 A1* | 3/2010 | Stannard | G06F 17/24 715/856 |
| 2011/0035744 A1* | 2/2011 | Bhatia | G06F 17/30893 717/174 |
| 2012/0316782 A1 | 12/2012 | Sartipi et al. | |
| 2013/0044137 A1* | 2/2013 | Forsblom | G09B 29/106 345/661 |
| 2014/0026093 A1* | 1/2014 | Picard | G06F 3/04847 715/781 |
| 2014/0282040 A1* | 9/2014 | Alfaro | H04L 51/20 715/739 |
| 2014/0324885 A1* | 10/2014 | McKenzie | G06F 17/30268 707/748 |
| 2015/0007128 A1* | 1/2015 | Yu | G06F 8/24 717/104 |
| 2015/0227299 A1* | 8/2015 | Pourshahid | G06F 3/04847 715/771 |
| 2015/0331596 A1* | 11/2015 | Yu | G06F 3/04847 715/762 |

* cited by examiner

*Primary Examiner* — Mahelet Shiberou
(74) *Attorney, Agent, or Firm* — Miles & Stockbridge PC (57) ABSTRACT

A system for providing an interactive map displays an interactive map marker that includes an associated location on the map, an associated data value, a visual indicator, and an underlying data model. The system receives an interaction from a user that modifies the visual indicator and changes the associated data value based on the visual indicator modification. The system then changes the underlying data model based on the visual indicator modification.

20 Claims, 8 Drawing Sheets

INTERACTIVE MAP MARKERS

FIELD

One embodiment is directed generally to a computer system, and in particular to a computer system that displays map markers.

BACKGROUND INFORMATION

Many software applications use geospatial data to enhance the user experience. Geospatial data is information that is both geographic and spatial pertaining to a location of natural or constructed features, objects, and/or structures. For example, latitude and longitude coordinates are a type of geospatial data. Geospatial data can be used to enhance application functions.

When geospatial data is integrated into a map display, each location point associated with geospatial data is typically represented as a graphical marker, icon, or indicator on a map display, collectively referred to as a "map marker." The typical map marker may convey some value or attribute, through the use of characteristics in addition to the display of a number. For example, a map may include map markers representing 30 homes for sale, and each map marker may have a characteristic of one of three different colors depending on where it falls in three home price ranges. Other characteristics known to convey values or attributes for map markers include shape, size, design, etc.

SUMMARY

One embodiment is a system for providing an interactive map. The system displays an interactive map marker that includes an associated location on the map, an associated data value, a visual indicator, and an underlying data model. The system receives an interaction from a user that modifies the visual indicator and changes the associated data value based on the visual indicator modification. The system then changes the underlying data model based on the visual indicator modification.

DETAILED DESCRIPTION

One embodiment is a system that provides interactive map markers. The interactive map markers represent a data value as well as a location on the map, and allow a user to revise the data value while interacting directly with the map marker in place. Therefore, a separate window or panel, which would obscure the underlying map and make the revising of the data value more difficult, is not needed.

As discussed, map markers typically include a characteristic that conveys or represents a value/attribute. However, these known map markers and associated maps do not provide an intuitive way to update the values on the map marker components themselves by interacting with traditional colored marker shapes. Instead, in order to update values, known map markers typically require a separate window or panel to be opened, and require a user to make modifications to the values within the separately opened entity. In contrast, embodiments of the present invention provide interactive map markers that allow for the associated values to be edited in place and directly on the map markers themselves.

Figure 1:
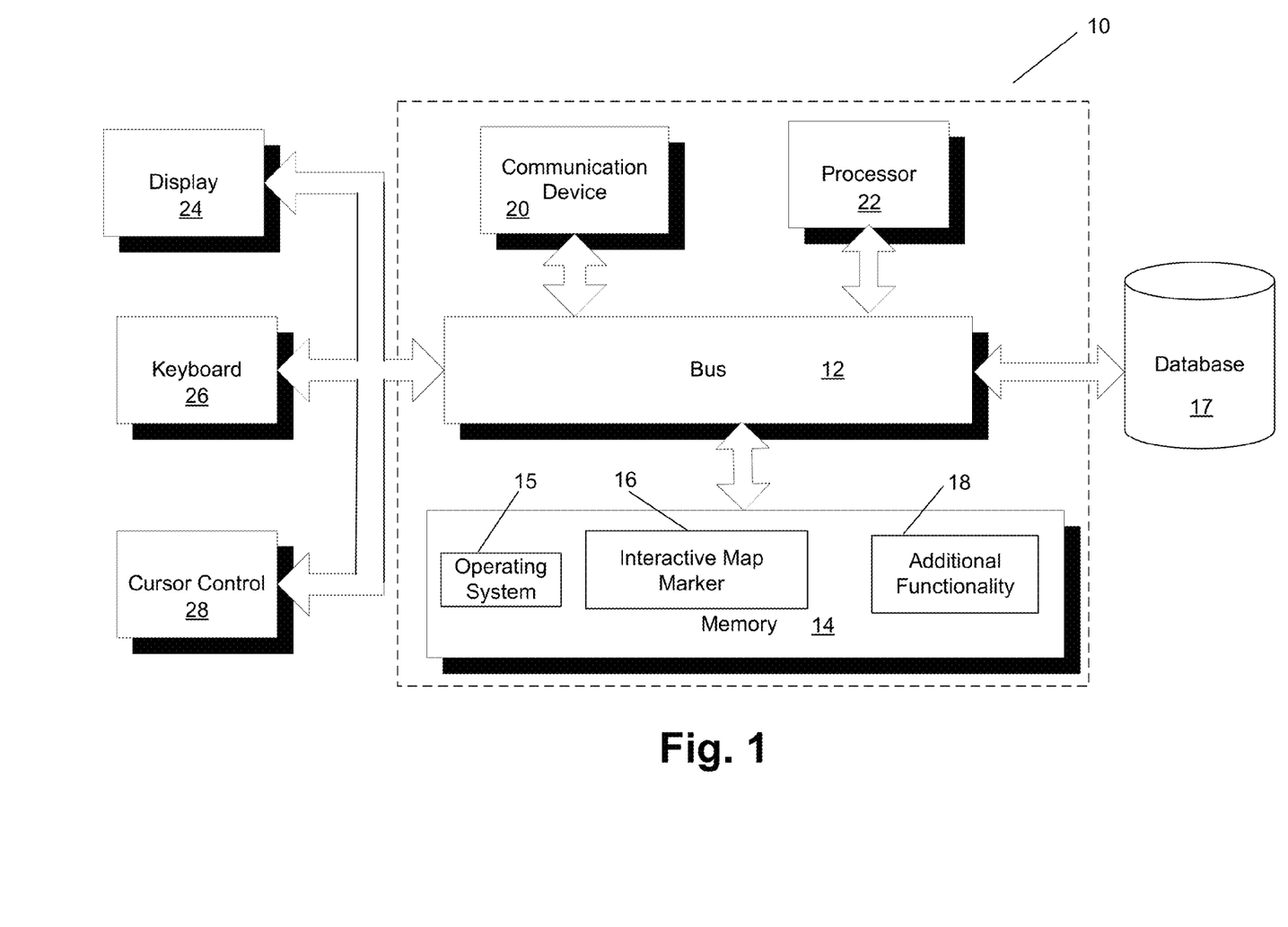
FIG. 1 is a block diagram of a computer system that can implement an embodiment of the present invention.

FIG. 1 is a block diagram of a computer system 10 that can implement an embodiment of the present invention. Although shown as a single system, the functionality of system 10 can be implemented as a distributed system. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network or any other method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 is further coupled via bus 12 to a display 24, such as a Liquid Crystal Display ("LCD"), for displaying information to a user, such as a map with interactive map markers. Display 24 can be a touchscreen that allows the user to interact with map markers using touchscreen gestures, including multi-touch gestures. A keyboard 26 and a cursor control device 28, such as a computer mouse, is further coupled to bus 12 to enable a user to interface with system 10.

In one embodiment, memory 14 stores software modules that provide functionality when executed by processor 22. The modules include an operating system 15 that provides operating system functionality for system 10. The modules further include an interactive map marker module 16 that provides and supports interactive map markers, as disclosed herein. System 10 can be part of a larger system, such as a mapping system or a geographic information system. Therefore, system 10 will typically include one or more additional functional modules 18 to include the additional functionality. A database 17 is coupled to bus 12 to provide centralized storage for modules 16 and 18 and store the data underlying each map marker, mapping information, attributes, etc.

Figure 2:
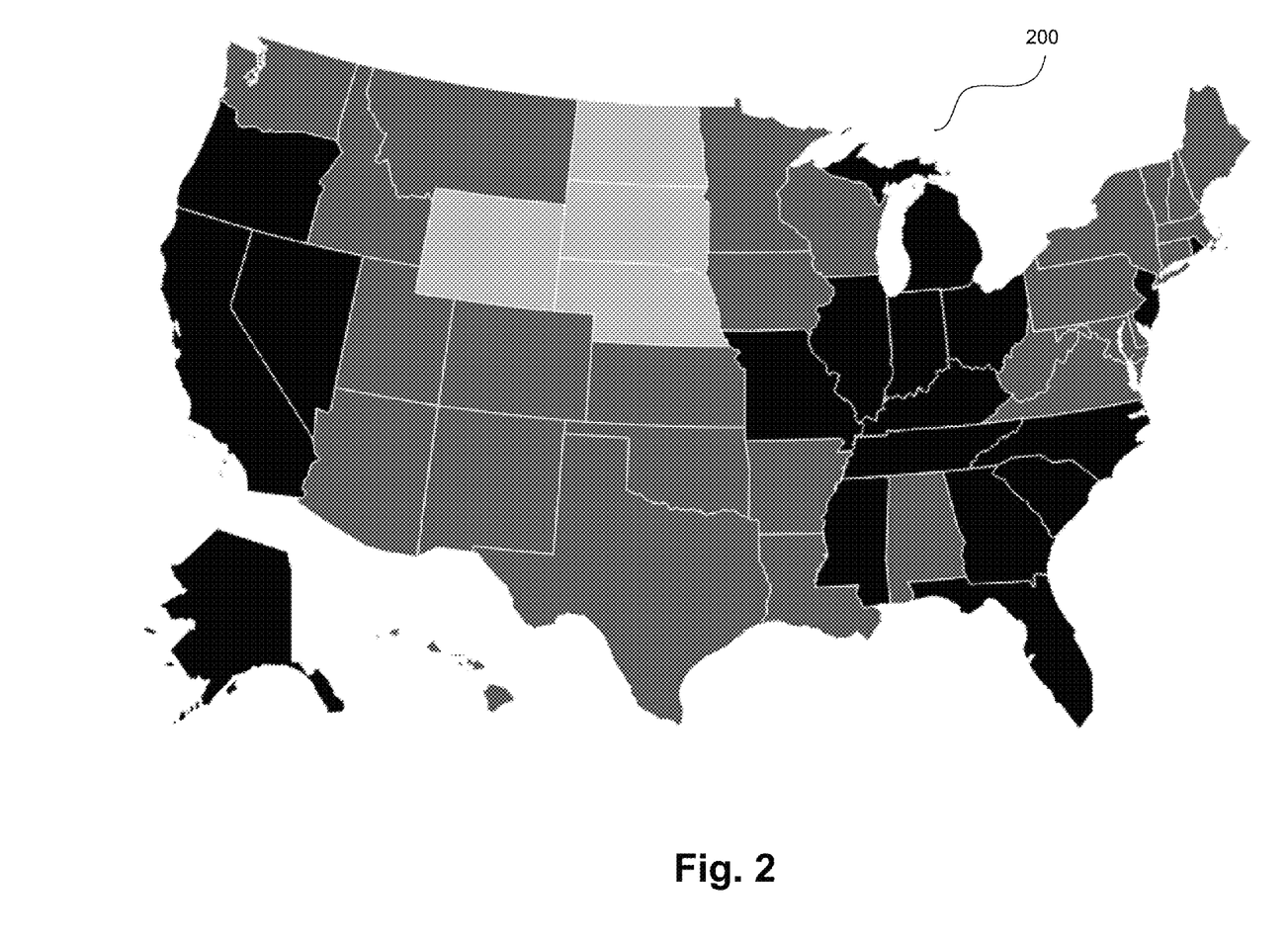
FIG. 2 illustrates a prior art United States map.

FIG. 2 illustrates a prior art United States map 200. Map 200 is a traditional thematic map showing some data distribution over the United States by color or grayscale. The color of each state indicates a data value for each state. An accompanying key (not shown) can provide the relationship between color and data value. However, looking at map 200, there is no intuitive way for a user to update any of the data associated with each state.

Figure 3:
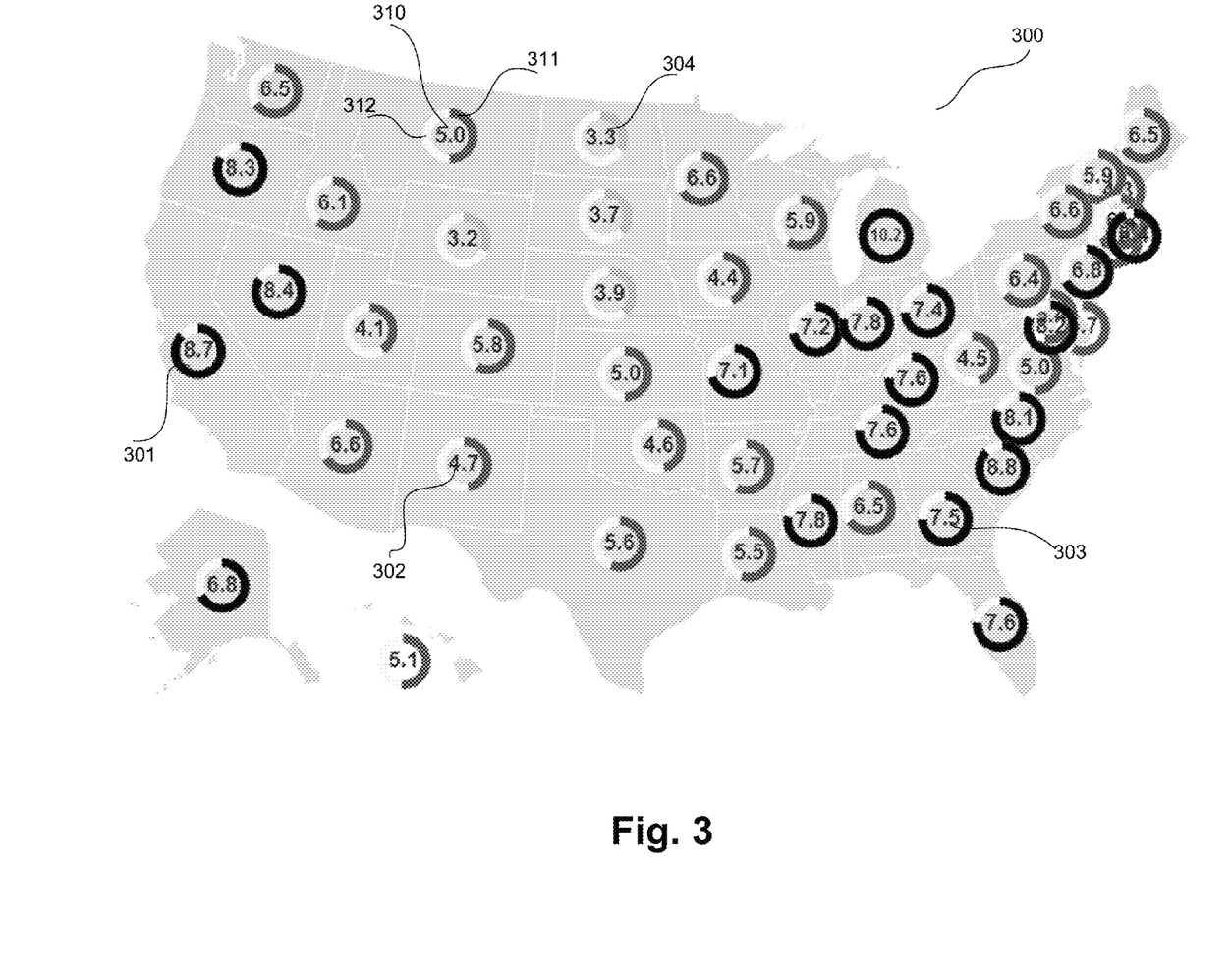
FIG. 3 illustrates a United States map in accordance with one embodiment of the invention.

FIG. 3 illustrates a United States map 300 in accordance with one embodiment of the invention. Map 300 includes interactive map markers for each state, such as map markers 301-304, etc. Map markers 301-304 of FIG. 3 in one embodiment are in the form of interactive circular status meter gauges that provide the same data distribution as was shown in map 200 of FIG. 2. Further, map markers 301-304 show data value thresholds, and can be updated in place. The interactive map markers of FIG. 3, in the form of gauges, in particular, provide a relatively easy way for a user to update the data through the dragging of the gauge indicator, which is more visually appealing than updating through a text field. In one embodiment, map 300 is a thematic map visualization component using Application Development Framework ("ADF") from Oracle Corp. within a Model-View-Controller framework.

Each gauge of FIG. 3 includes a numerical indicator of the associated data value or gauge value (e.g., numerical indicator 310), and an interactive gauge indicator or "visual indicator" formed of two "colors" or grayscales (e.g., colors 311 and 312) that provides a visual indication of the data value. One of the colors can be white or light colored, and one can be dark colored. The amount of the circumference of the gauge occupied by one of the colors, such as the dark color, is proportional to the data value.

Figure 4:
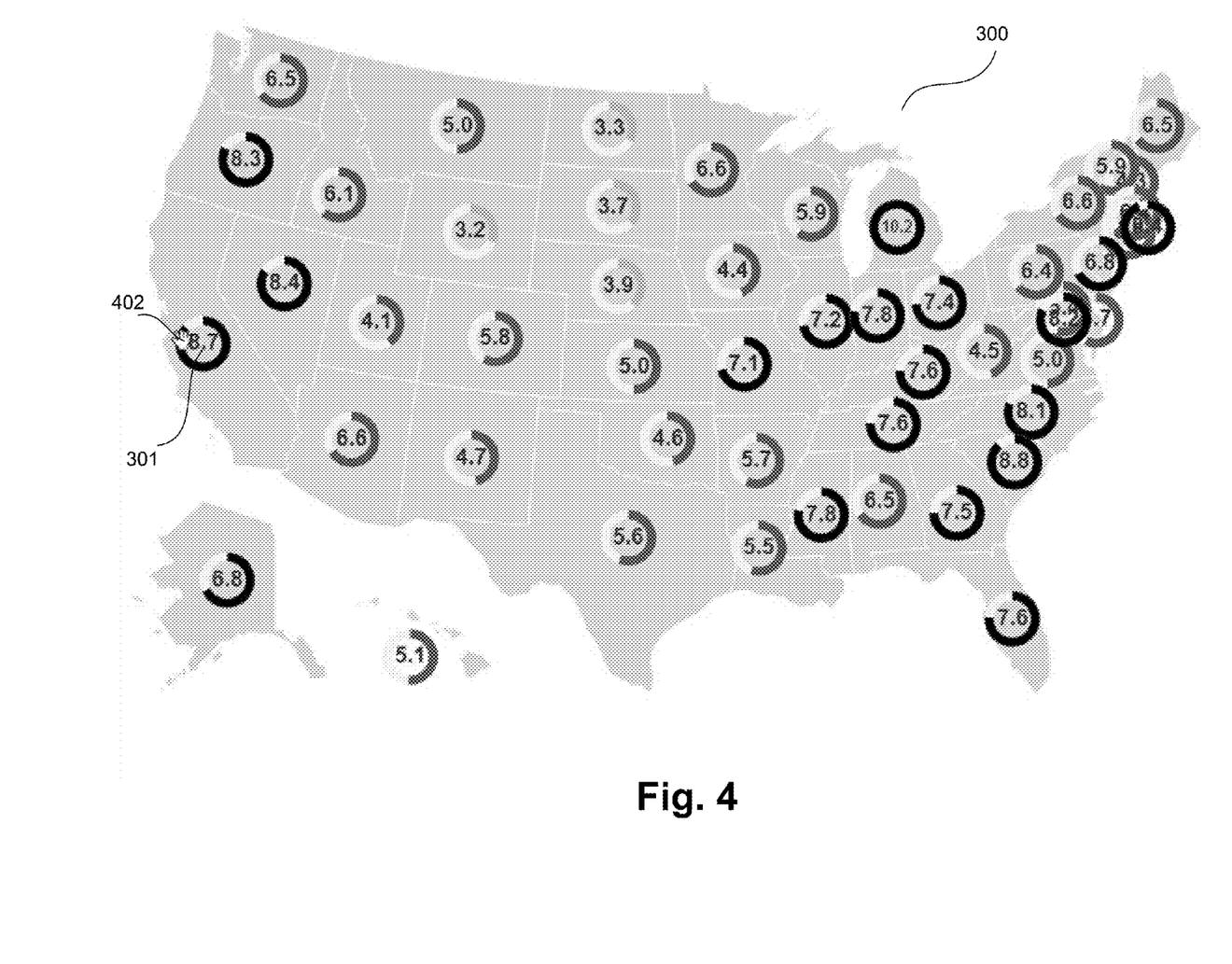
FIG. 4 illustrates the United States map of FIG. 3 in accordance with one embodiment.

FIG. 4 illustrates the United States map 300 of FIG. 3 in accordance with one embodiment. FIG. 4, and FIGS. 5-7 below, illustrate the process of a user updating the values for interactive map marker 301. Shown in FIG. 4 is the user hovering over gauge 301 using a cursor, which changes the cursor to a hand 402 indicating the gauge/visual indicator can be moved. Further, in one embodiment, a tooltip or other popup can be displayed indicating that the user can drag or otherwise interact with the gauge or other interactive component in addition to the cursor changing to a hand.

Figure 5:
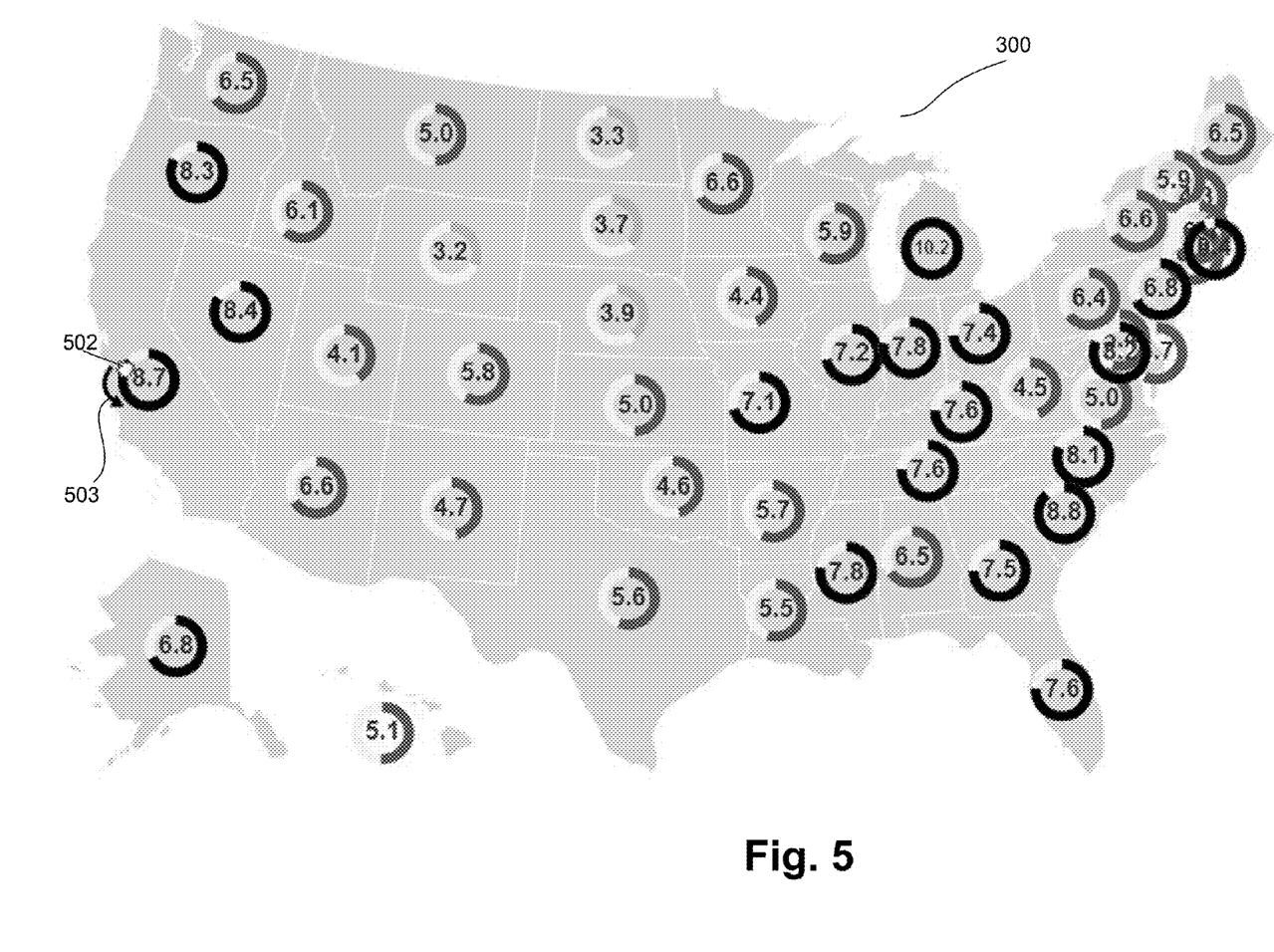
FIG. 5 illustrates the United States map of FIG. 3 in accordance with one embodiment.

FIG. 5 illustrates the United States map 300 of FIG. 3 in accordance with one embodiment. As shown in FIG. 5, when the user clicks and holds the gauge indicator, the hand changes to a fist 502 indicating the user has grabbed onto something that can now be moved. If the user moves fist 502 using, for example, a mouse, the number shown by the gauge will update along with the gauge indicator length and color. In the example of FIG. 5, the user moves fist 502 in the counter-clockwise direction, as indicated by arrow 503, which reduces the gauge value.

Figure 6:
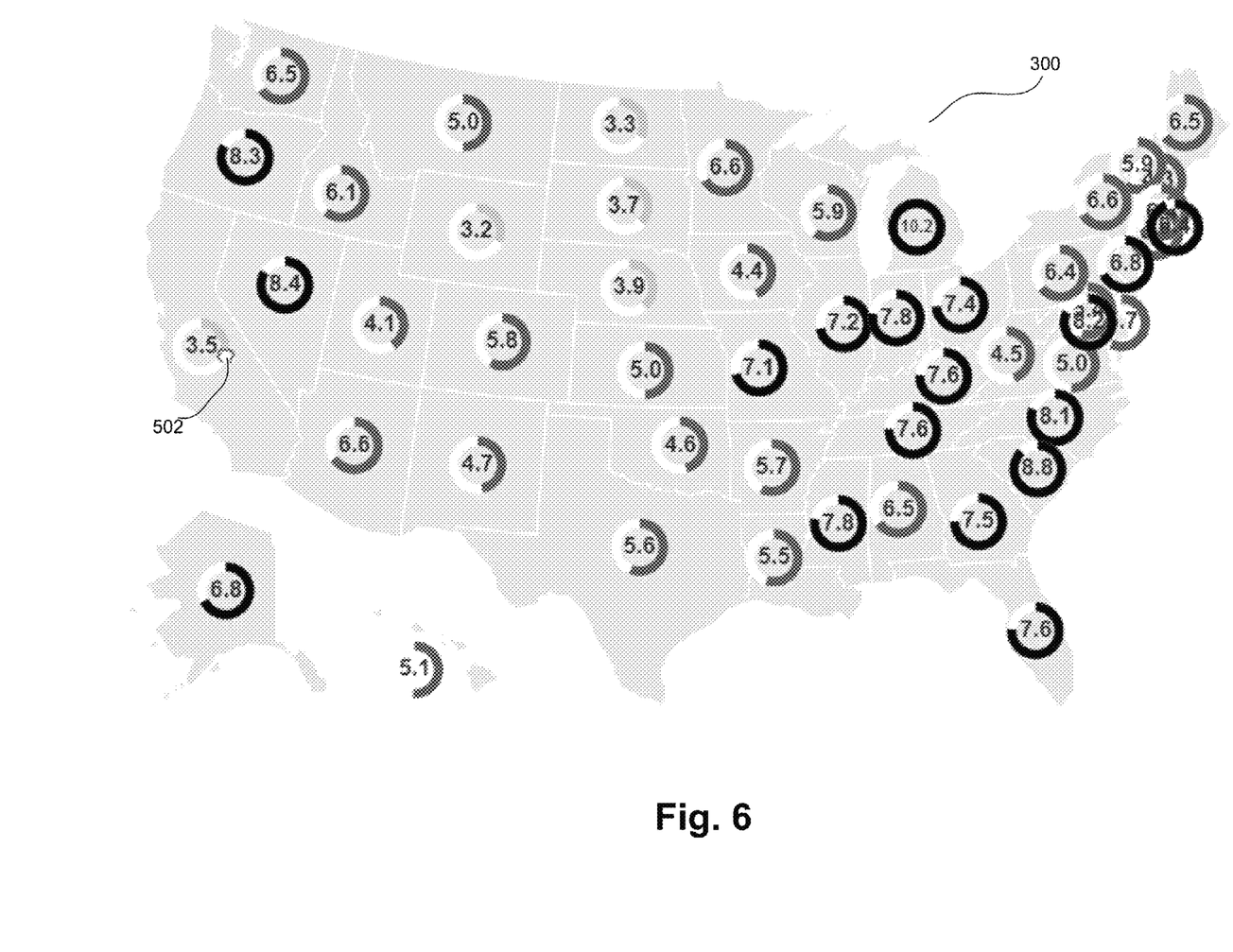
FIG. 6 illustrates the United States map of FIG. 3 in accordance with one embodiment.

FIG. 6 illustrates the United States map 300 of FIG. 3 in accordance with one embodiment. FIG. 6 shows the result of the click+hold+drag of the mouse over the gauge indicator. FIG. 6 shows fist 502 at its moved resting place, and shows that the numerical value is now 3.5, and the color of the gauge indicator has changed to indicate a reduced value.

Figure 7:
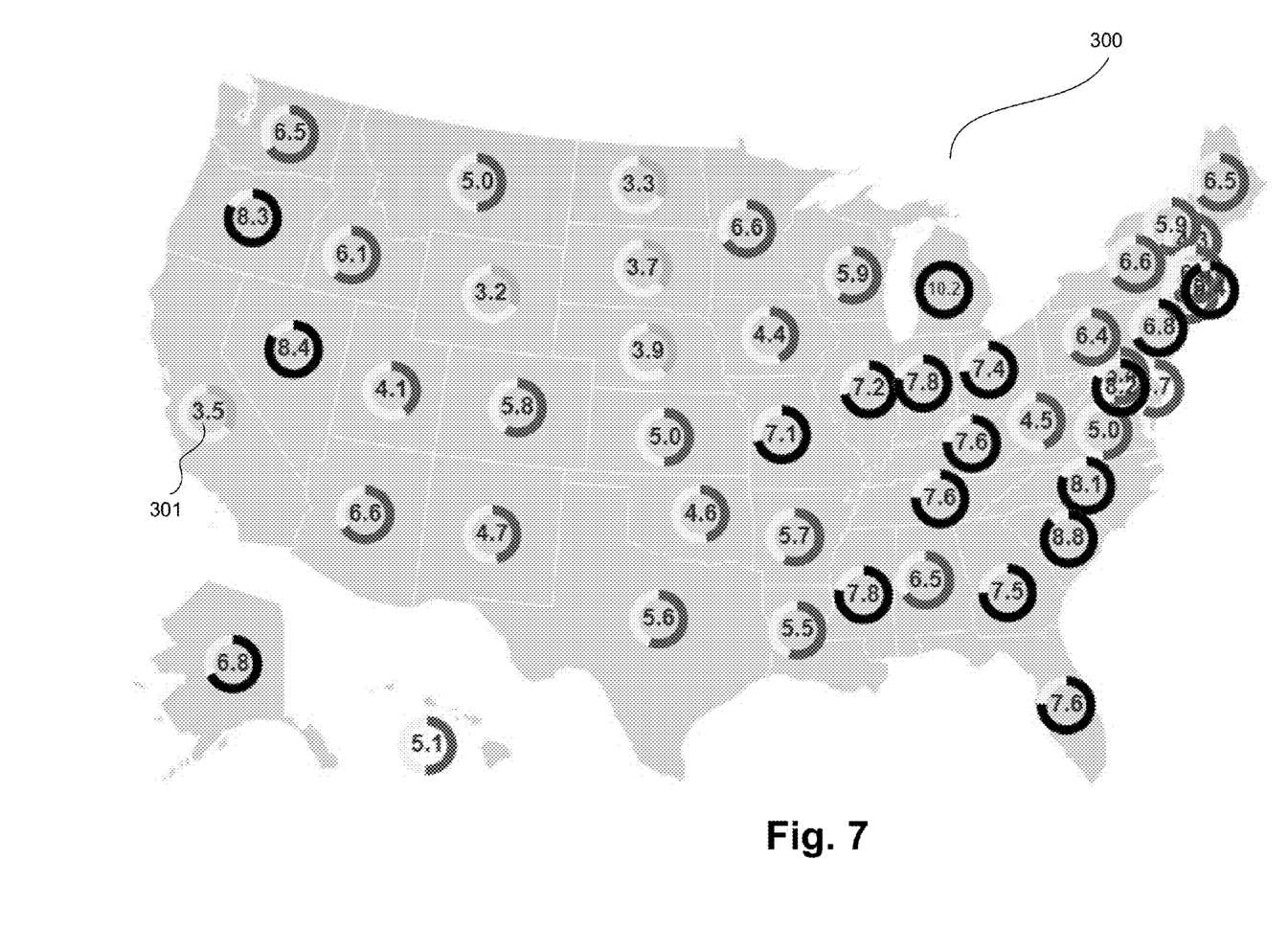
FIG. 7 illustrates the United States map of FIG. 3 in accordance with one embodiment.

FIG. 7 illustrates the United States map 300 of FIG. 3 in accordance with one embodiment. After releasing the mouse click, the gauge stops updating and the value has now changed from 8.7 to 3.5.

As the value of the interactive map marker changes, as shown in FIGS. 3-7, the underlying value of the data model will be updated to reflect the changed value. In one embodiment, an application programming interface ("API") is exposed on the map visualization component to enable rendering of the interactive map markers. The data rendering logic is extended in order to render the interactive map markers, and an eventing model is established so that interacting with the interactive map markers, such as the dragging of a gauge indicator, will trigger the map component to update the data model.

In one embodiment, the map visualization component can be created in Java within a desktop application or JavaScript in a browser application. The data model is a representation of data, such as a Java Collection or a simple Array of values that could be stored in a database. The location based interactive components such as gauges would receive events from the environment, such as a mouse click in a browser application or a touch gesture on a mobile or tablet device, and translate the events to a higher level event such as a value change event, which in turn would be fired to and received by the map component. The map component would then associate the value change event with the geographic context of the underlying data and update the appropriate entry in the data model.

In one embodiment, the following API is used to expose the interactive map marker functionality using Oracle Application Development Framework:

```
<dvt:thematicMap basemap="usa">
    <dvt:areaLayer layer="states">
        <dvt:areaDataLayer var="row" value="#{stateData.model}">
            <dvt:areaLocation name="#{row.name}">
                <dvt:statusMeterGauge value="#{row.data}"
    orientation="circular" inlineStyle="height:35px;width:35px;"
    maximum="10" plotArea="on">
                    <dvt:gaugeThreshold maximum="4"/>
                        <dvt:gaugeThreshold maximum="6.6"/>
                        <dvt:gaugeThreshold/>
                </dvt:statusMeterGauge>
            </dvt:areaLocation>
        </dvt:areaDataLayer>
    </dvt:areaLayer>
</dvt:thematicMap>
```

In the above API, the data model is passed to the thematic map in the dvt:areaDataLayer value attribute via a collection model. Each status meter gauge is associated with a United States state location because it is a child of dvt:areaLocation which gets the state location from the name column in the collection model.

The value from the collection model is associated with the status meter gauge using the value attribute on dvt:statusMeterGauge. When the user changes the value by dragging on the gauge indicator, the gauge can then fire a value change event to the parent thematic map component which will then identify the collection model row containing the state from the value change event in the model's name column. The thematic map will then update the value in that row's data column to that sent in the value change event.

Figure 8:
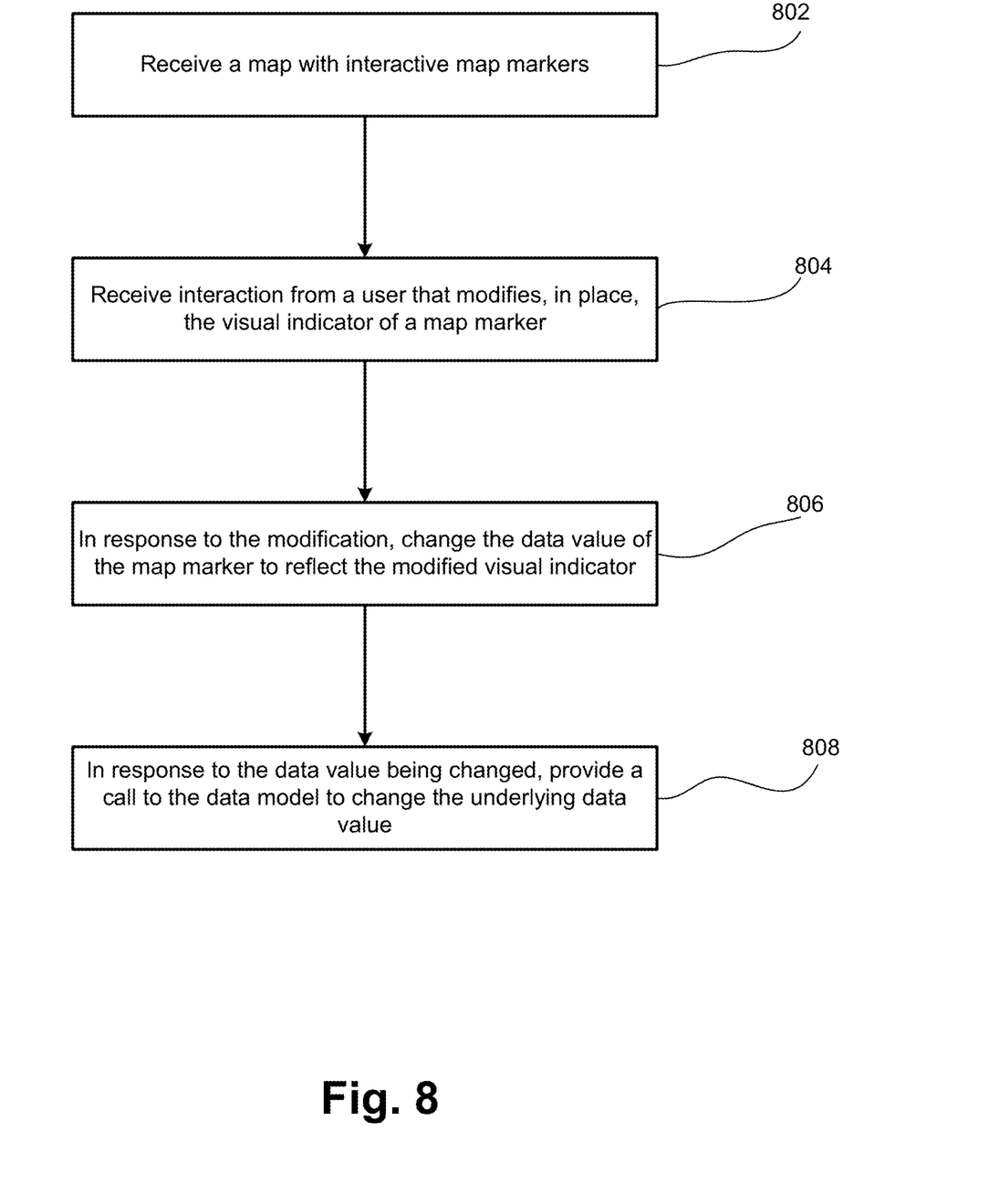
FIG. 8 is a flow diagram of an interactive map marker module providing interactive map markers in accordance with embodiments of the present invention.

FIG. 8 is a flow diagram of interactive map marker module 16 providing interactive map markers in accordance with embodiments of the present invention. In one embodiment, the functionality of the flow diagram of FIG. 8 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 802, module 16 receives a map with the interactive map markers. Each interactive map marker has an associated location on the map, a visual indicator that is reflective of an underlying data value, and a data value, with an optional data value indicator. In one embodiment, the interactive map markers are in the form of interactive gauges, as shown in FIGS. 3-7.

At 804, at least one interactive map marker receives an interaction from the user that modifies, in place, the visual indicator.

At 806, in response to the modification, the data value is changed to reflect the modified visual indicator. The data value indicator, if one exists, is also changed.

At 808, in response to the data value being changed, a call is made to the data model to change the underlying data value. The data model may be, for example, the underlying database.

Although embodiments using interactive gauges are disclosed above, other types of interactive map markers with selectable visual indicators can be used. For example, the interactive map marker may be a spinner or slider, where the arrow or slider lever can be moved by the user, or a bar chart or pie chart where a user can manipulate a portion of the chart. In another embodiment, where the map marker may be a rating based on a number of highlighted stars or other objects, one or more of the rating objects can be selected or de-selected by the user, thus modifying the underlying rating.

The gestures used to change values with interactive map markers vary depending on the embodiments of the map markers. The interaction can be through the use of a mouse, or any other device, or directly on the map though the use of a touchscreen.

As disclosed, changes in data for map markers can be implemented by direct user interaction, and can be visualized by animating the growth or decrease of a visual indicator, such as a gauge indicator, thus providing the user with additional context. By using interactive map markers, embodiments change a map from a traditionally static display of data into an interactive way to display and update values.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer-readable medium having instructions stored thereon that, when executed by a processor, cause the processor to generate an interactive map, the generating comprising:
    providing a model-view-controller framework including a data model, a map visualization component, and an event model;
    displaying, by the map visualization component, a map including a plurality of interactive map markers, each interactive map marker comprising an associated location on the map, an associated data value from the data model, and a selectable visual indicator for the associated data value;
    receiving, by the event model, an interaction with the map from a user that modifies the selectable visual indicator of one of the interactive map markers;
    sending, from the event model to the map visualization component, a value change event including the modification to the selectable visual indicator of the interactive map marker; and
    in response to receiving the value change event at the map visualization component,
        changing the associated data value of the interactive map marker based on the modification to the selectable visual indicator, and
        updating the associated data value of the interactive map marker in the data model.

2. The computer-readable medium of claim 1, wherein the interactive map marker comprises a gauge, and the visual indicator is a gauge indicator.

3. The computer-readable medium of claim 1, wherein the interactive map marker comprises a number indicator corresponding to the associated data value.

4. The computer-readable medium of claim 1, further comprising exposing an application programming interface on the map visualization component to render the interactive map marker.

5. The computer-readable medium of claim 1, wherein the interaction is via a cursor control device.

6. The computer-readable medium of claim 1, wherein the interaction is via a touchscreen interaction.

7. The computer-readable medium of claim 1, wherein the interactive map marker includes a numerical indicator for the associated data value, and, in response to receiving the value change event at the map visualization component, the numerical indicator of the interactive map marker is changed based on the modification to the selectable visual indicator.

8. A method for generating an interactive map, the method comprising:
    providing a model-view-controller framework including a data model, a map visualization component, and an event model;
    displaying, by the map visualization component, a map including a plurality of interactive map markers, each interactive map marker comprising an associated location on the map, an associated data value from the data model, and a selectable visual indicator for the associated data value;
    receiving, by the event model, an interaction with the map from a user that modifies the selectable visual indicator of one of the interactive map markers;
    sending, from the event model to the map visualization component, a value change event including the modification to the selectable visual indicator of the interactive map marker; and
    in response to receiving the value change event at the map visualization component,
        changing the associated data value of the interactive map marker based on the modification to the selectable visual indicator, and
        updating the associated data value of the interactive map marker in the data model.

9. The method of claim 8, wherein the interactive map marker comprises a gauge, and the visual indicator is a gauge indicator.

10. The method of claim 8, wherein the interactive map marker comprises one of a slider or a bar chart.

11. The method of claim 8, further comprising exposing an application programming interface on the map visualization component to render the interactive map marker.

12. The method of claim 8, wherein the interaction is via a cursor control device.

13. The method of claim 8, wherein the interaction is via a touchscreen interaction.

14. The method of claim 8, wherein the interactive map marker includes a numerical indicator for the associated data value, and, in response to receiving the value change event at the map visualization component, the numerical indicator of the interactive map marker is changed based on the modification to the selectable visual indicator.

15. An interactive map system, comprising:
a database;
a display;
a storage device; and
a processor configured to:
provide a model-view-controller framework including a data model, a map visualization component, and an event model;
display, by the map visualization component, a map including a plurality of interactive map markers, each interactive map marker comprising an associated location on a map, an associated data value from the data model, and a selectable visual indicator for the associated data value;
receive, by the event model, an interaction with the map from a user that modifies the selectable visual indicator of one of the interactive map markers;
send, from the event model to the map visualization component, a value change event including the modification to the selectable visual indicator of the interactive map marker; and
in response to receiving the value change event at the map visualization component,
change the associated data value of the interactive map marker based on the modification to the selectable visual indicator, and
update the associated data value of the interactive map marker in the data model.

16. The interactive map system of claim 15, wherein the interactive map marker comprises a gauge, and the visual indicator is a gauge indicator.

17. The interactive map system of claim 15, wherein the interactive map marker comprises one of a slider or a bar chart.

18. The interactive map system of claim 15, the processor is further configured to expose an application programming interface on the map visualization component to render the interactive map marker.

19. The interactive map system of claim 15, wherein the display is a touchscreen and the interaction is via the touchscreen.

20. The interactive map system of claim 15, wherein the interactive map marker includes a numerical indicator for the associated data value, and, in response to receiving the value change event at the map visualization component, the numerical indicator of the interactive map marker is changed based on the modification to the selectable visual indicator.

* * * * *

UNITED STATES PATENT AND TRADEMARK OFFICE
CERTIFICATE OF CORRECTION

PATENT NO. : 9,678,645 B2  
APPLICATION NO. : 14/302887  
DATED : June 13, 2017  
INVENTOR(S) : Dai et al.

Page 1 of 1

It is certified that error appears in the above-identified patent and that said Letters Patent is hereby corrected as shown below:

In the Drawings

On Sheet 2 of 8, in Fig. 2, before "Fig. 2" insert -- PRIOR ART --.

Signed and Sealed this  
Twenty-ninth Day of May, 2018

Andrei Iancu  
*Director of the United States Patent and Trademark Office*